(12) United States Patent
Desclos et al.

(10) Patent No.: US 10,587,913 B2
(45) Date of Patent: Mar. 10, 2020

(54) RF SYSTEM FOR DISTRIBUTION OF OVER THE AIR CONTENT FOR IN-BUILDING APPLICATIONS

(71) Applicant: Ethertronics, Inc., San Diego, CA (US)

(72) Inventors: Laurent Desclos, San Diego, CA (US); Vahid Manian, San Diego, CA (US); Jeffrey Shamblin, San Marcos, CA (US)

(73) Assignee: Ethertronics, Inc., San Diego, CA (US)

( * ) Notice: Subject to any disclaimer, the term of this patent is extended or adjusted under 35 U.S.C. 154(b) by 5 days.

(21) Appl. No.: 15/627,464

(22) Filed: Jun. 20, 2017

(65) Prior Publication Data

US 2018/0131990 A1    May 10, 2018

Related U.S. Application Data

(63) Continuation-in-part of application No. 15/495,974, filed on Apr. 24, 2017.
(Continued)

(51) Int. Cl.
*H04N 7/20* (2006.01)
*H04N 21/436* (2011.01)
(Continued)

(52) U.S. Cl.
CPC ......... *H04N 21/436* (2013.01); *H01Q 1/2291* (2013.01); *H01Q 1/38* (2013.01); *H01Q 5/20* (2015.01); *H01Q 9/42* (2013.01); *H01Q 21/28* (2013.01); *H04H 20/63* (2013.01); *H04L 12/66* (2013.01); *H04N 21/2381* (2013.01); *H04N 21/4263* (2013.01); *H04N 21/43637* (2013.01);
(Continued)

(58) Field of Classification Search
CPC . H04N 21/4263; H04N 21/631; H04N 21/436
USPC ...................................... 725/63, 72
See application file for complete search history.

(56) References Cited

U.S. PATENT DOCUMENTS 6,765,536 B2   7/2004   Phillips et al.
6,987,493 B2   1/2006   Chen
(Continued)

*Primary Examiner* — Pankaj Kumar
*Assistant Examiner* — Sahar Aqil Riaz
(74) *Attorney, Agent, or Firm* — Dority & Manning, P.A.

(57) ABSTRACT

A system is described for distributing over the air (OTA) channels within buildings and homes. The system can implement one or more active multi-mode antennas for improved performance and reliability. The system can be configured as a mesh network where multiple nodes are distributed to improve the probability of channel capture across the VHF and UHF frequencies used for over the air TV distribution. A node consists of a beam steering antenna that operates at the VHF and UHF frequencies for TV signal reception, a receiver and demodulation circuit, a transcoder to convert the received information for re-distribution, and a transceiver capable of operation at a secondary frequency band for use in re-distributing the information to communication devices in proximity of the node. The secondary frequency band can be the common WLAN (Wireless Local Area Network) system such as Wi-Fi, with the Wi-Fi transceiver also containing beam steering antennas for improved in-building propagation of the re-distributed information.

17 Claims, 8 Drawing Sheets

Related U.S. Application Data

(60) Provisional application No. 62/326,592, filed on Apr. 22, 2016.

(51) Int. Cl.

| | | |
|---|---|---|
| *H01Q 5/20* | (2015.01) | |
| *H04N 21/63* | (2011.01) | |
| *H04N 21/426* | (2011.01) | |
| *H04L 12/66* | (2006.01) | |
| *H04N 21/61* | (2011.01) | |
| *H04N 21/2381* | (2011.01) | |
| *H01Q 1/38* | (2006.01) | |
| *H04N 21/4363* | (2011.01) | |
| *H01Q 1/22* | (2006.01) | |
| *H01Q 21/28* | (2006.01) | |
| *H01Q 9/42* | (2006.01) | |
| *H04H 20/63* | (2008.01) | |

(52) U.S. Cl.
CPC ....... *H04N 21/6112* (2013.01); *H04N 21/631* (2013.01)

(56) References Cited

U.S. PATENT DOCUMENTS

| | | | |
|---|---|---|---|
| 7,068,234 B2 | 6/2006 | Sievenpiper | |
| 7,215,289 B2 | 5/2007 | Harano | |
| 7,830,320 B2 | 11/2010 | Shamblin | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 | 5/2014 | Shamblin et al. | |
| 8,754,817 B1* | 6/2014 | Kuo | H01Q 1/243 343/700 MS |
| 9,065,496 B2 | 6/2015 | Rowson et al. | |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 | 9/2016 | Zhu et al. | |
| 9,479,242 B2 | 10/2016 | Desclos et al. | |
| 9,590,703 B2 | 3/2017 | Desclos et al. | |
| 9,755,305 B2 | 9/2017 | Deslos et al. | |
| 9,755,580 B2 | 9/2017 | Desclos et al. | |
| 2010/0085921 A1* | 4/2010 | Wu | H04L 27/2626 370/329 |
| 2013/0176964 A1* | 7/2013 | Pan | H04B 7/0426 370/329 |
| 2013/0230325 A1* | 9/2013 | Chow | H04B 10/25753 398/67 |
| 2015/0311969 A1* | 10/2015 | Desclos | H04B 7/10 455/63.4 |
| 2016/0119741 A1* | 4/2016 | Huang | H04L 12/2816 455/41.3 |
| 2017/0133764 A1* | 5/2017 | Tinaphong | H01Q 1/2291 |
| 2017/0215210 A1* | 7/2017 | Lipowski | H04B 7/04 |
| 2018/0175503 A1* | 6/2018 | Liu | H01Q 5/385 |

\* cited by examiner

RF SYSTEM FOR DISTRIBUTION OF OVER THE AIR CONTENT FOR IN-BUILDING APPLICATIONS

CROSS-REFERENCE TO RELATED APPLICATIONS

This application is a continuation in part (CIP) of commonly owned U.S. Ser. No. 15/495,974, filed Apr. 24, 2017; which claims benefit of priority with U.S. Provisional Ser. No. 62/326,592, filed Apr. 22, 2016; the entire contents of each of which are hereby incorporated by reference.

BACKGROUND

Field of the Invention

This invention relates to the field of wireless communication; and more particularly, to a radio frequency distribution system employing a reconfigurable mesh network to distribute over the air channels within buildings and homes.

Description of the Related Art

Television (TV) signals transmitted at very high frequency (VHF) and ultra-high frequency (UHF) have been available for reception by the general public for many years. These VHF and UHF signals are generally transmitted over the air by way of local transmitters and antennas in cities and communities. Historically, over the air transmission was the only method for delivery of channel information to homes. The typical over the air TV reception for homes and offices in a city typically consisted of a television antenna, often placed on a rooftop of a home or building and further connected to a television using a transmission line such as a coaxial cable. These conventional type antennas were capable of receiving VHF and UHF signals, with an efficient antenna for this application being on the order of 1 or 2 meter in length or extent. More recently, the TV channels can be delivered via cable distribution systems and satellite based systems. There are two main differences between the over the air transmission method and the cable and satellite systems: cost of service and quality of service.

The over the air TV signals can be received by users in the vicinity of the TV transmission tower, with the transmission tower containing a high power transmitter and antenna. As the users are located further from the transmission tower a lower strength signal will be received resulting in a lower quality video and audio content. Hills, buildings, and other obstructions between the transmission tower and the homes trying to receive the TV signals will also degrade the strength of the TV signals, resulting in a lower quality channel after reception, or in the extreme case, the inability to receive the channel. Antennas used to receive the TV signals at homes perform better when positioned outdoors and high above the home, typically 20 to 30 feet above ground level. Unfortunately many customers cannot use outdoor antennas, with a large number of the customers living in apartment buildings where there is no access to the roof for antenna installation. Single family home owners who do have access to the roof are sometimes not allowed to place antennas on the roof due to home owner association restrictions.

An antenna can be placed inside the home, but the ability to receive the signals is degraded due to the reduced height of the antenna and the obstruction created by the walls of the home. The signal inside rooms in the home will also have significant variation in amplitude due to reflections off of walls, furniture, and even the people living in the home. The problems described here with reliably receiving TV signals over the air is due to the fact that these are radiated signals which can be disturbed and degraded by the propagation channel.

The cable distribution method is a more reliable method of delivering TV channels to consumers since the channel information is brought into the home on a shielded coaxial cable which provides steady, undisturbed signal strength. The satellite based distribution system tends to be more reliable than over the air method even though the satellite system also relies on radiated signals. The satellite system is a more reliable communication link because the transmitted signal is radiating down from a satellite, with this signal less affected by hills, buildings, and other features. As long as the receive antenna for satellite reception has line of sight to the satellite the signal will be received at a near constant signal strength.

There are also cost differences between these TV channel delivery methods. Over the air TV reception of local television channels is free to the public in most countries except for the cost of the receive antenna used for reception of the signals. Both cable distribution systems and satellite based systems charge a monthly fee for delivery of the content, and this monthly fee can be over $50 or $100 depending on the number of channels requested by the consumer. The cable distribution companies and satellite providers need to financially compensate the local TV stations for the right to re-distribute the channels on their respective systems, with this cost increase typically passed on to the consumer. The consumer has an alternative to paying for cable or satellite TV service in that they can use the internet to stream TV shows and other content that is currently being distributed by the cable and satellite providers. As long as the consumer has an internet connection in the home, then content available on the internet can be streamed to the TV for viewing. Unfortunately the local TV channels which contain local news, sports, and other content are generally not available for viewing through online streaming. A reliable method of receiving over the air TV channels in parallel with streaming content over the internet would be desirable for both the consumers and cable and satellite distribution companies.

Complicating over the air television further is the need to provide TV to several devices spread throughout the home. A typical family might have one to three TVs in the home and as well as several smartphones and tablet or laptops which can be used for viewing content. A good TV distribution plan will provide a method for enabling multiple devices throughout a home, with several of these devices being mobile, to access TV channels.

DESCRIPTION OF THE INVENTION

Figure 1:
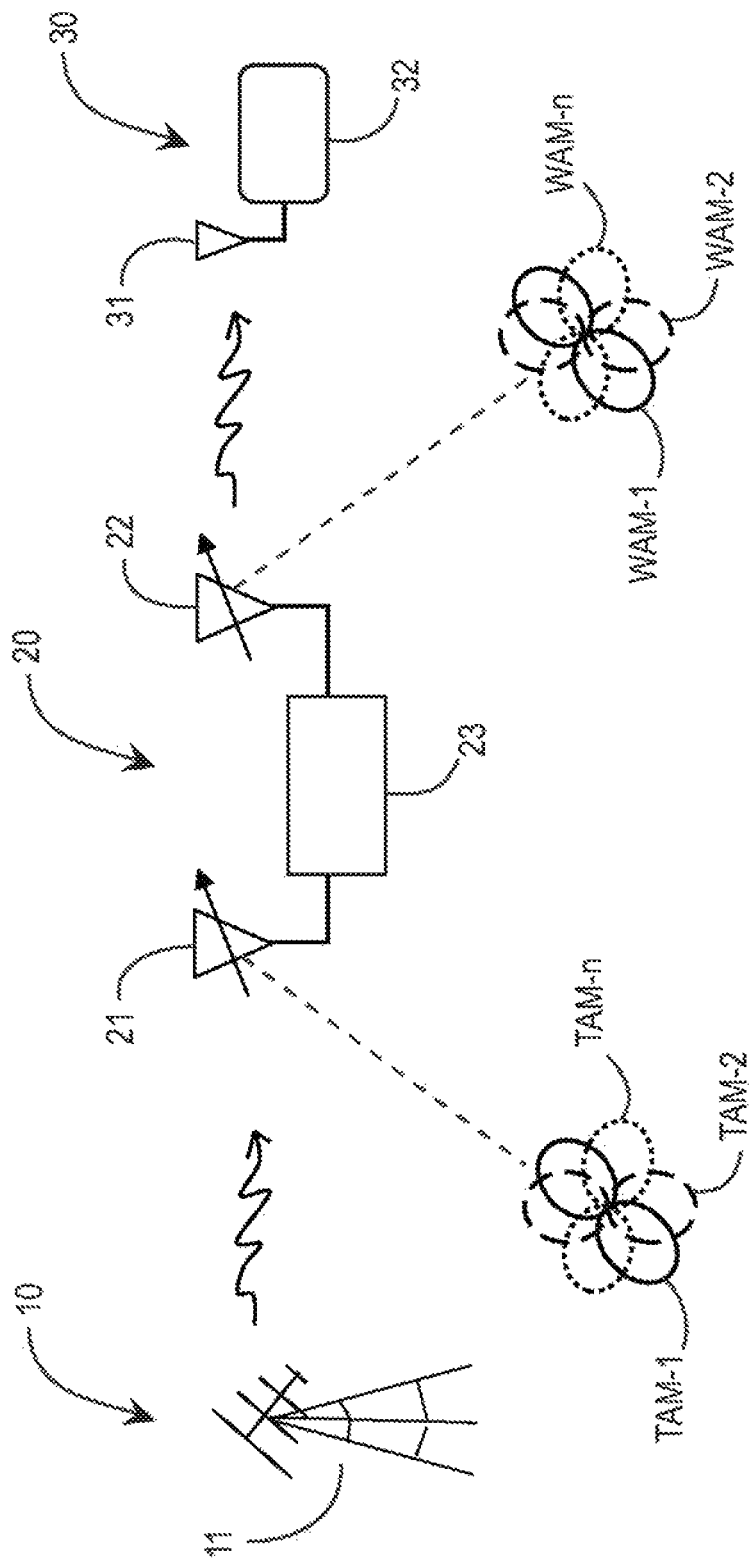
FIG. 1 shows a system for distributing over the air (OTA) content in a home or building.

A wireless local area network (WLAN) can be used to assist in the delivery of the TV channels throughout the home. WLAN has been adopted across homes and businesses in most regions of the world, with a large number of client devices such as smartphones, laptops, and Tablets capable of WLAN reception. More recently WLAN has been adopted for high throughput applications such as video streaming for in-building applications. These types of systems also require good performance from the RF radio and antenna system to ensure quality operation, and these systems increase the number of WLAN systems and RF signaling encountered in businesses, apartment buildings, and neighborhoods. The requirement for increased data rates to support a larger number of users and video applications has been met by a move toward higher orders of modulation in the transmitted signal as well as higher orders of multiple input multiple output (MIMO). These improvements in modulation technique place a requirement on improved signal to noise ratio (SNR) or signal to interference plus noise ratio (SINR) levels. Additionally, better control of the radiated field from the antenna system associated with the access point will be required to provide better communication link quality for an antenna system tasked to provide higher throughput and a more reliable link.

Another technique that can be used to improve streaming of TV content throughout the home is mesh networks. Implementation of mesh network techniques provides a method for improving communication link performance and reliability for networks. A mesh network is a network topology in which each node relays data for the network. All mesh nodes or a subset of nodes cooperate in the distribution of data in the network. A mesh network can provide improved reliability and offers redundant links for the portions comprising the network. When one node can no longer operate, the rest of the nodes can still communicate with each other, directly or through one or more intermediate nodes. Wireless mesh networks can self-form and self-heal, with the self-healing feature providing a dynamic method of compensating for faulty devices in a network. Mesh networks can relay messages using either a flooding technique or a routing technique, depending on the protocol and intended application of the communication network. A mesh network can be used to provide more reliable communication links between nodes in a network, but like a non-mesh network, the communication links are dependent on the performance of the antenna systems on each side of the communication link. Passive antennas, which are typically used in commercial communication systems have fixed radiation patterns and fixed polarization states. What is needed is a method of dynamically adjusting the radiation characteristics of the antennas used at the nodes to provide the capability of compensating for movement of one or both nodes as well as compensate for changes in the propagation channel such as obstructions caused by objects or personnel.

Commonly owned U.S. Pat. Nos. 9,240,634; 8,648,755; 8,362,962; and 7,911,402 each describe a multi-mode antenna and beam steering technique wherein a single antenna is capable of generating multiple radiation pattern modes. This is effectuated with the use of offset parasitic elements that alter the current distribution on the driven antenna as the reactive load on the parasitic is varied. This beam steering technique where multiple modes are generated is a modal antenna technique, and an antenna configured to alter radiating modes in this fashion will be referred to here as a "modal antenna" or "multi-mode antenna". This antenna architecture solves the problem associated with a lack of volume in mobile devices and small commercial communication devices to accommodate antenna arrays needed to implement more traditional beam steering hardware.

Now, described herein is an RF distribution system where VHF and UHF TV channels are received using a beam steering antenna. The channels (signals) are then demodulated, transcoded, and re-broadcast throughout a region such as a home at Wi-Fi frequencies, with the Wi-Fi antenna system also configured as a beam steering system for improved communication link performance.

The entire system may configured as a single packaged assembly for easy installation; however, in the alternative one or more portions of the system can be separated out into modular sub components.

Additional VHF/UHF beam steering antennas can be positioned throughout the region and used in a mesh network to improve signal reception performance, receiving VHF/UHF signals and re-transmitting to other antennas using Wi-Fi frequencies.

System metrics such as signal to noise ratio (SNR), signal to interference and noise ratio (SINR), and receive signal sensitivity indicator (RSSI) are used at both VHF/UHF frequencies and Wi-Fi frequencies to monitor and to adjust adaptive antenna system characteristics to optimize mesh performance.

Figure 7:
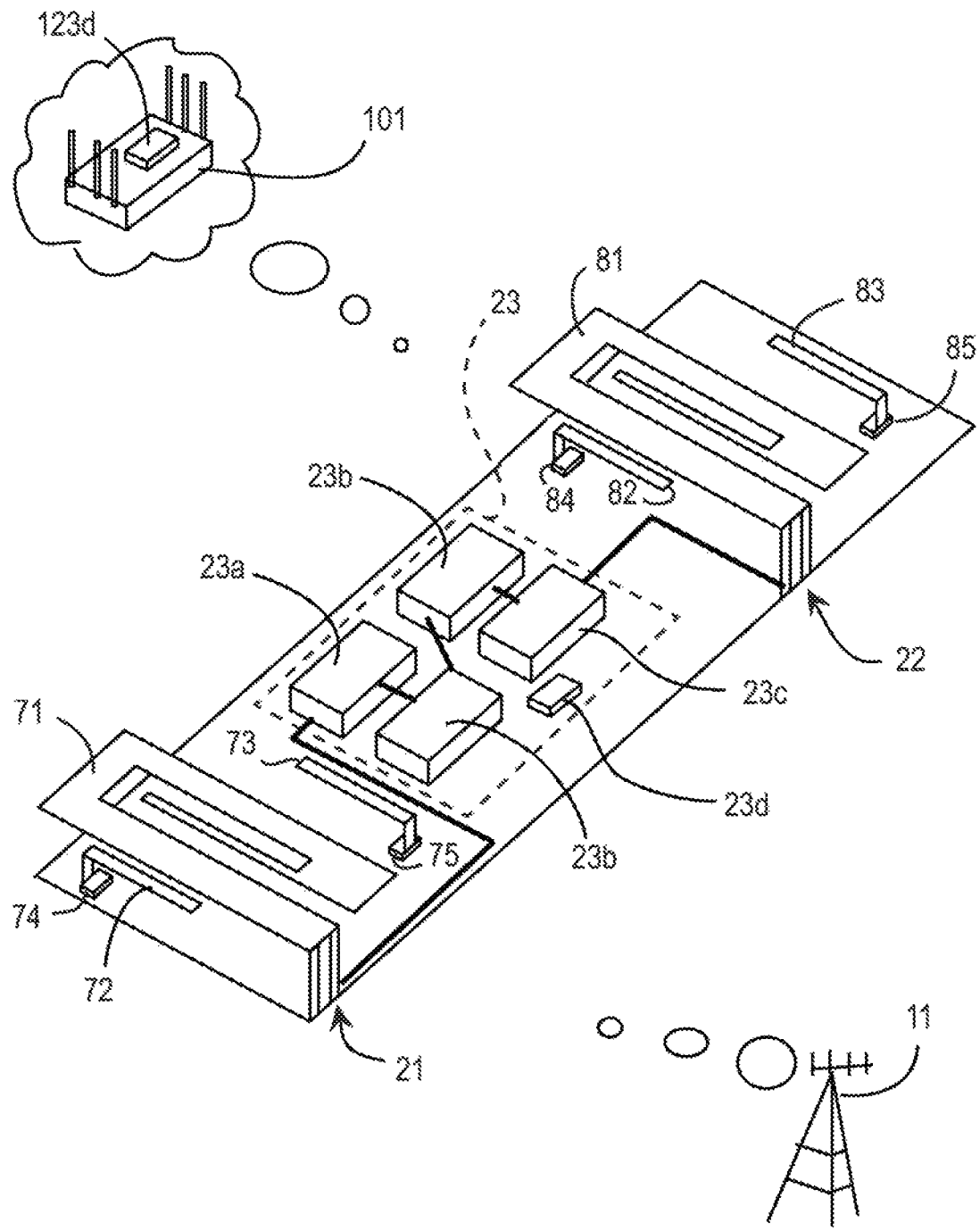
FIG. 7 shows an example of a modular unit configured to receive OTA signals (UHF; VHF) from base tower, translate the signals into WiFi and transmit/rebroadcast through WiFi signals in a building (for example, with an access point or WiFi enabled device).

In one embodiment of the present invention, as shown in FIG. 7, an RF distribution system is comprised of a beam steering antenna system designed for VHF/UHF reception, a receiver/tuner circuit, a demodulation circuit, a transcoding circuit alter the data format, a Wi-Fi radio, and a beam steering antenna system designed for Wi-Fi frequencies. TV channels broadcast at VHF/UHF frequencies are received by the VHF/UHF beam steering antenna and receiver, demodulated, then transcoded to alter the format of the data, and transmitted by the Wi-Fi radio using the Wi-Fi beam steering antenna system. The beam steering antenna systems used at VHF/UHF and Wi-Fi can be adaptive antenna systems with these adaptive antenna systems defined as an antenna capable of generating multiple radiation modes. Each radiation mode of the adaptive antenna system has a radiation pattern associated with it, with these radiation patterns varying between the modes in terms of radiation pattern shape and/or polarization properties. A candidate antenna for the adaptive antenna is a Modal antenna, with the Modal antenna being capable of generating multiple radiation patterns from a single port antenna. An algorithm is resident in a computer in the RF distribution system with this algorithm tasked to control the radiation modes of the adaptive antenna systems used at VHF/UHF and Wi-Fi frequencies. The algorithm implemented with each adaptive antenna provides the capability of surveying a channel quality indicator (CQI) metric such as SINR (Signal to Interference and Noise Ratio), RSSI (Receive Signal Sensitivity Indicator), MCS (Modulation Coding Scheme), or similar metric obtained from the baseband processor of the communication system to provide the capability to sample radiation patterns and make a decision in regards to operating on the optimal radiation pattern or mode based on the CQI for the communication link. The use of this RF distribution system will result in improved received signal quality of the VHF/UHF frequencies and improved received signal quality of the Wi-Fi signals throughout the region defined for signal distribution. An additional performance benefit is derived from the ability to place this RF distribution system at an optimal location within the home or region to service to receive VHF/UHF over the air signals. The Wi-Fi link provides the ability to optimize placement of the RF distribution system as well as a means to distribute the TV channel information over Wi-Fi frequencies to a wide variety of mobile and fixed devices and TVs within the desired service region.

In another embodiment of the present invention a second RF distribution system as previously described is placed within the home or region to service and this second system is used in a similar manner to receive VHF/UHF TV channels and transmit this information throughout the service area using Wi-Fi frequencies. This second RF distribution system is used with the first RF distribution system to form a mesh network, with these two systems working in conjunction to receive as many VHF/UHF channels as possible and to improve Wi-Fi transmission coverage in the desired service region. The first RF distribution system takes the role of "Master" node in a "Master/Slave" configuration and serves as a network controller for the two RF distribution systems. The second RF distribution system receives VHF/UHF channels and transmit the channel information via Wi-Fi to the first RF distribution system. The first RF distribution system determines which VHF/UHF channels are required from the second RF distribution system for Wi-Fi transmission. The first RF distribution system transmits all channel information over Wi-Fi to the devices in the service region.

In another embodiment of the present invention the second distribution system transmits TV channel information at Wi-Fi to the service region, with these Wi-Fi transmissions coordinated with the first RF distribution system in terms of VHF/UHF channels to transmit and which Wi-Fi channel to use for transmission.

In another embodiment of the present invention three or more RF distribution systems can be used in a mesh configuration in the home or service region to improve VHF/UHF signal reception and/or Wi-Fi transmission quality. The first RF distribution system takes the role of "Master node" and controls the other nodes in the mesh. The RF distribution system that receives the best VHF/UHF signal at a specific channel is designated to receive that channel and to transmit this channel via Wi-Fi to the Master node. The master node transmits all TV channel information via Wi-Fi throughout the home or service area.

In another embodiment of the present invention the additional multiple nodes formed by RF distribution systems transmit TV channel information at Wi-Fi to the service region, with these Wi-Fi transmissions coordinated with the Master node in terms of VHF/UHF channels to transmit and which Wi-Fi channel to use for transmission. The Wi-Fi radios in the additional nodes act as repeaters at Wi-Fi to improve quality of reception of the Wi-Fi signals throughout the service area.

In another embodiment of the present invention a software application is used to assess information from an RF distribution system to determine if the system is positioned or placed at an optimal location for VHF/UHF signal reception. The software application can be loaded and used on a computer, the processor in a mobile device such as a cellphone, smartphone, or Tablet, or fixed processor. The quality of reception of VHF/UHF signals by the RF distribution system under assessment is sent to the computer or device that contains the software application via Wi-Fi signals. The RF distribution system can be moved to various locations and positioned in various orientations and the number and quality of channels can be tracked and compared to determine optimal RF distribution system placement. When multiple RF distribution systems are used as nodes in a mesh network the application software can obtain VHF/UHF channel number and quality from the Master node and the various nodes can be optimized in terms of orientation and placement.

In another embodiment of the present invention one or multiple nodes in a mesh network configured with RF distribution systems can contain fixed beam or passive antennas on either the VHF/UHF portion, the Wi-Fi portion, or both portions of the overall system. The fixed radiation pattern antenna allows for a reduced system cost at the expense of performance.

In another embodiment of the present invention, a communication protocol other than Wi-Fi can be used to transmit the VHF/UHF channel information throughout the home or service area.

In another embodiment of the present invention, a communication protocol other than VHF/UHF TV channel information can be received and then transmitted using Wi-Fi frequencies throughout the home or service area.

In another embodiment of the present invention, a communication protocol other than VHF/UHF TV channel information can be received and then transmitted using a protocol other than Wi-Fi throughout the home or service area.

Now turning to the drawings, FIG. 1 shows a system 20 for distributing over the air (OTA) content in a home or building, the system includes a first antenna system 21 configured to receive first signals from a broadcast tower 11. The first signals can comprise UHF and VHF television signals. A translation circuit 23 is coupled to the first antenna system 21 and configured to translate the first signal into a second signal for rebroadcasting within the home or building. The translation circuit 23 is further coupled to a second antenna system 22, wherein the second antenna system is configured to transmit the second signal.

In the illustrated embodiment, the first antenna system is configured as an active multi-mode antenna system (or "modal antenna") which is capable of beam steering, frequency tuning, or both beam steering and frequency tuning. The first antenna system is shown being capable of generating first television antenna mode TAM-1, second television antenna mode TAM-2, and nth television antenna mode TAM-n. In this regard, the first antenna system being implemented as an active multi-mode antenna system allows for beam steering and/or frequency tuning for enhancing the quality of the incoming received signal.

Moreover, in the illustrated embodiment, the second antenna system is configured as an active multi-mode antenna system (or "modal antenna") which is capable of beam steering, frequency tuning, or both beam steering and frequency tuning. The second antenna system is shown being capable of generating first WiFi antenna mode WAM-1, second WiFi antenna mode WAM-2, and nth WiFi antenna mode WAM-n. In this regard, the second antenna system being implemented as an active multi-mode antenna system allows for beam steering and/or frequency tuning for enhancing the quality of the outgoing transmitted signal, for example, the signal can be steered in a direction of a television unit or access point.

Also shown is a television unit 30, the television unit comprises a WiFi receiver 32 and a WiFi antenna 31 configured to receive the second signal.

In some embodiments, a WiFi access point can be used to receive the WiFi signal, wherein the WiFi access point is further configured to communicate the second signal to a television unit, for example via a coaxial or other cable extending therebetween.

While multi-mode antennas are illustrated it should be understood that other antennas, such as passive antennas having a single radiation pattern mode (fixed mode), may be similarly implemented.

Figure 2:
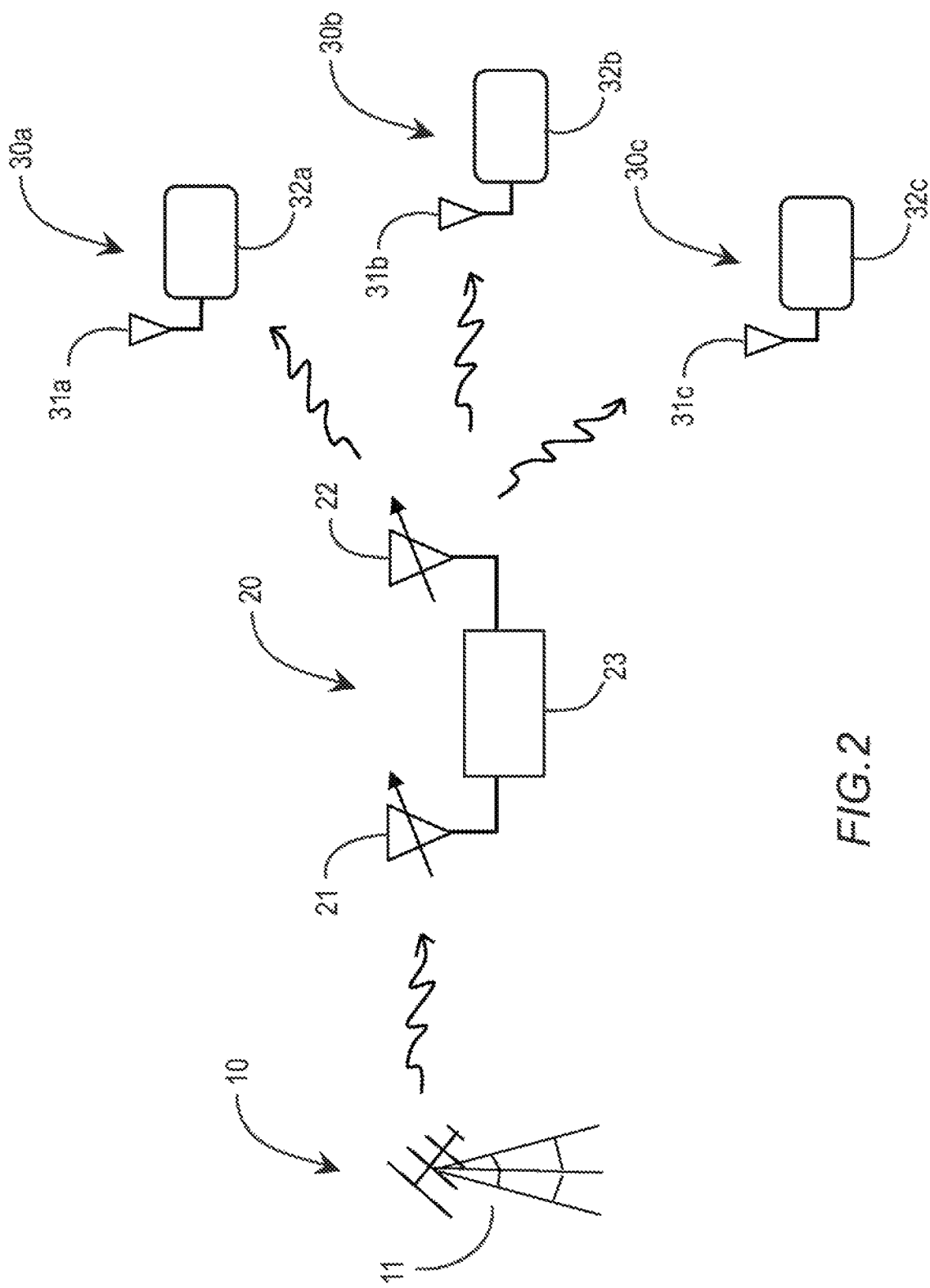
FIG. 2 shows a schematic representation of the system of FIG. 1 with three televisions along with WiFi antennas and WiFi receivers.

FIG. 2 shows a schematic representation of the system of FIG. 1 with the addition of three televisions 30a; 30b; and 30c, respectively, along with corresponding WiFi antennas 31a; 31b; and 31c and WiFi receivers 32a; 32b; and 32c. The Wifi Antennas are each configured to receive second signals form the system 20, and thereby provide content to the respective television. Here, the mode of the second antenna 22 can be changed to steer a gain in the direction of a television unit. Metrics can be sampled over a network connection, and optimum radiant pattern modes may be determined and implemented for optimizing service.

Figure 3:
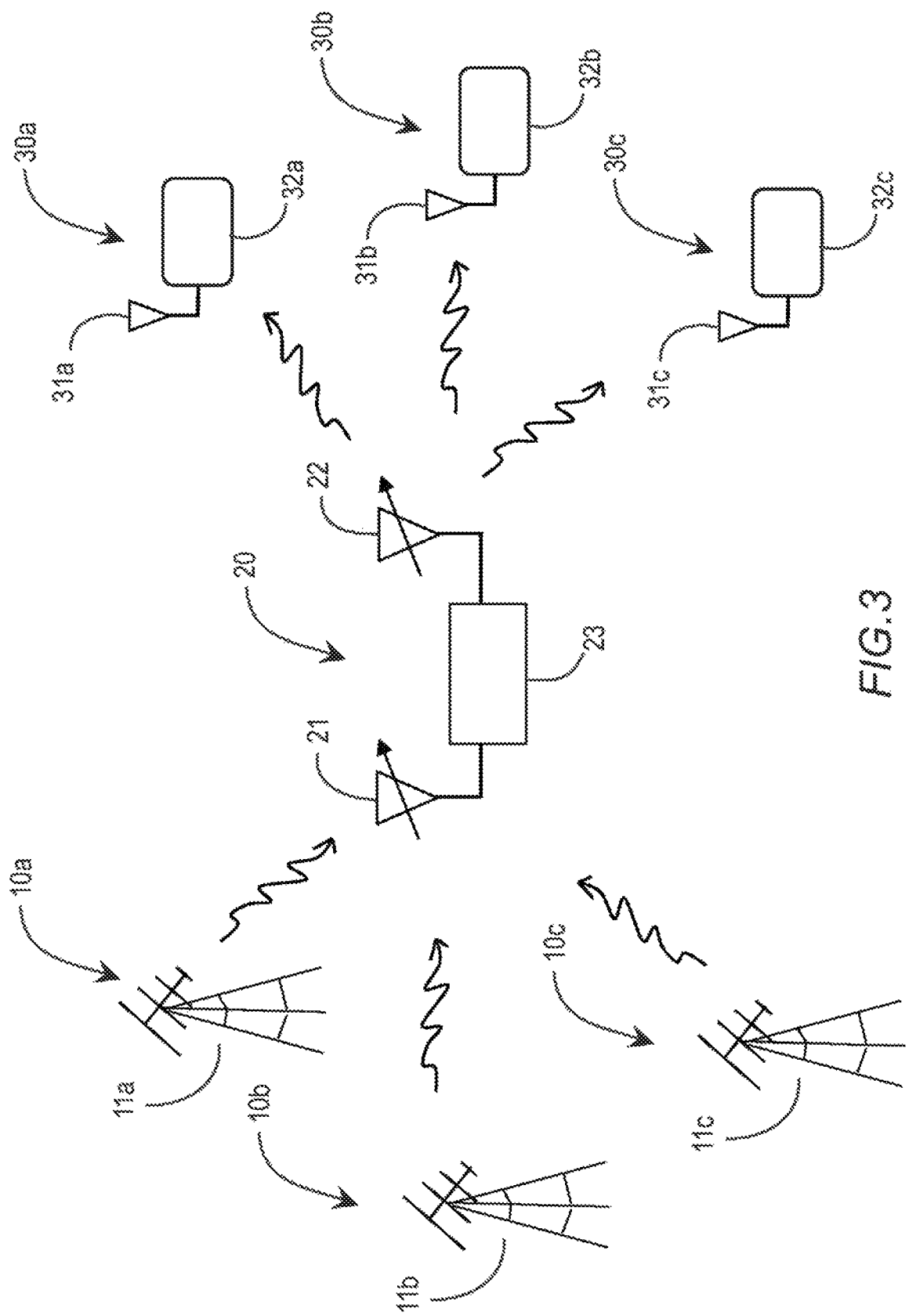
FIG. 3 shows a schematic representation of the system of FIG. 2 with three broadcast towers.

FIG. 3 shows a schematic representation of the system of FIG. 2 with the addition of three broadcast towers 11a; 11b; and 11c, respectively. Each of the broadcast towers are within range of the first antenna system 21 for providing a broadcast signal. Here, the first antenna system can alter its radiation pattern mode in order to optimize signals received from one or more of the three broadcast towers.

Figure 4:
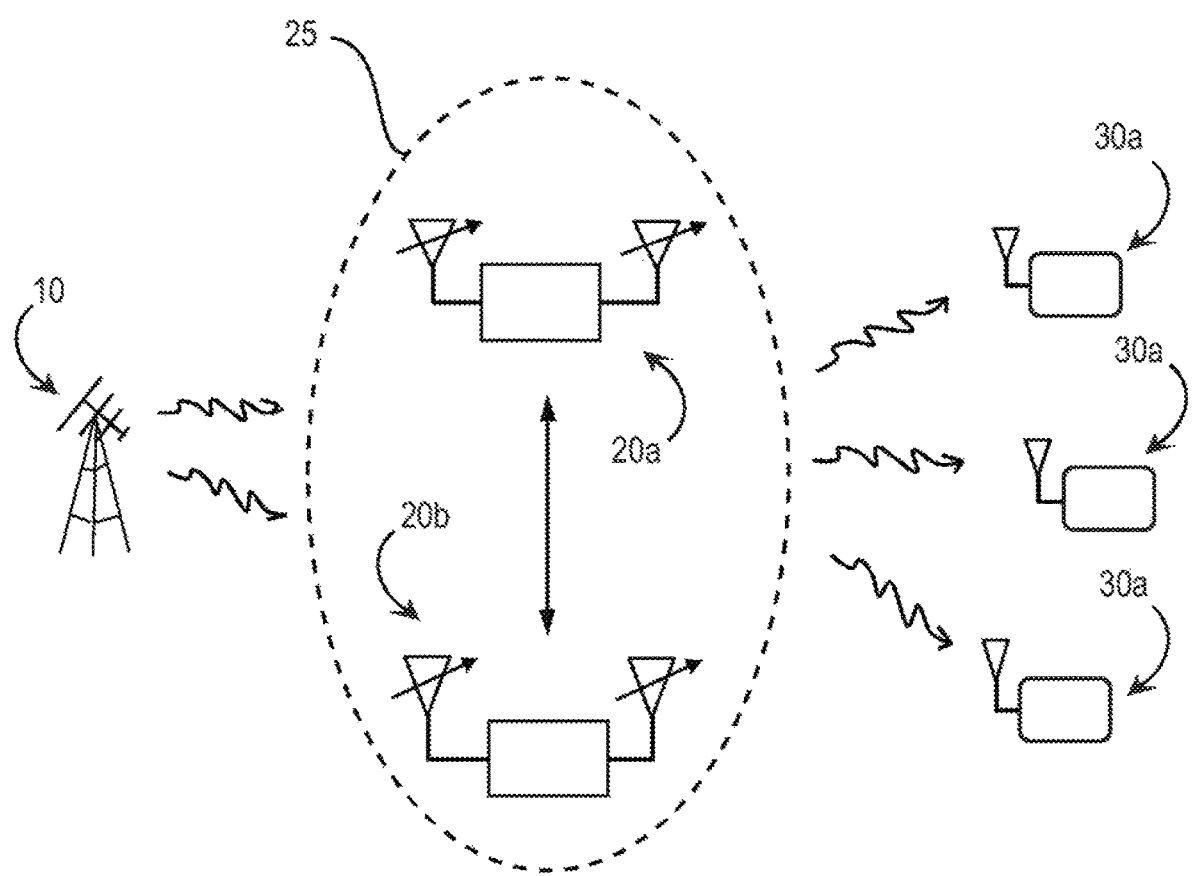
FIG. 4 shows a schematic representation of two over the air distribution systems; each of the OTA distribution systems is configured to distribute broadcast signals to three devices, for example television units as shown.

FIG. 4 shows a schematic representation of a network including two over the air distribution systems 20a; 20b, respectively. Each of the OTA distribution systems is configured to receive signals form transmit tower 10 and distribute broadcast signals to three devices, for example television units 30a; 30b; and 30c. In this embodiment, one of the two over the air distribution systems may be selected to exchange signals between tower 10 and devices 30(*a-c*). Alternatively, both systems 20(*a-b*) can be used simultaneously to optimize transfer of information between tower 10 and devices 30(*a-c*).

Figure 5:
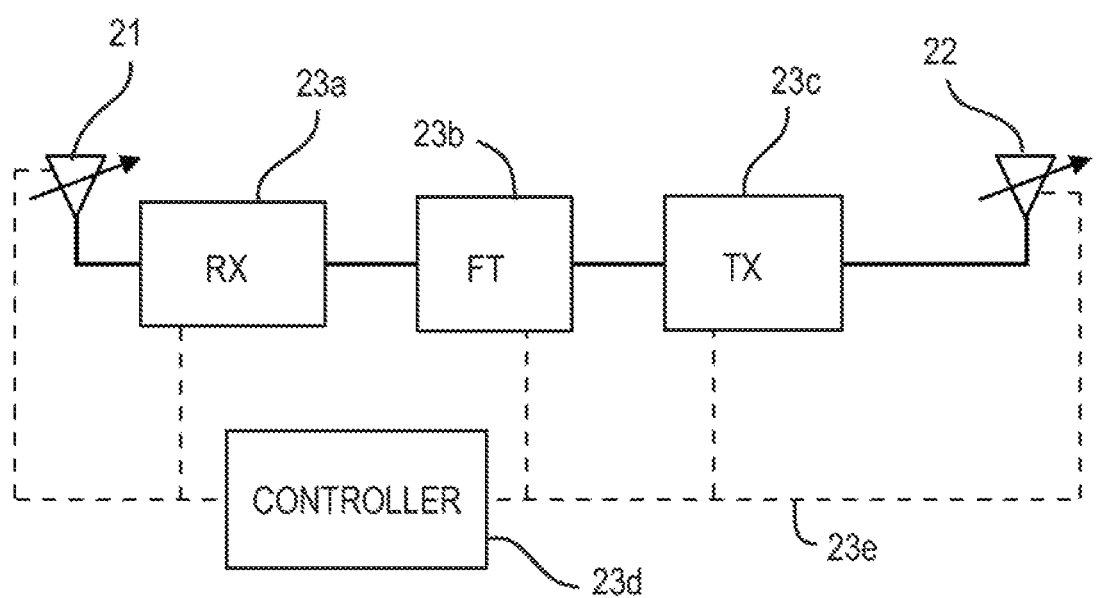
FIG. 5 shows an OTA distribution system including a first antenna sub-system, a receiver (RX) for a first frequency band (example, VHF/UHF), a frequency translator (FT), a transceiver (TX) for a second frequency band (example, WiFi), and a second antenna sub-system.

FIG. 5 shows an OTA distribution system including a first antenna sub-system 21, a receiver 23a (RX) for a first frequency band (example, VHF/UHF), a frequency translator 23b (FT), a transceiver 23c (TX) for a second frequency band (example, WiFi), and a second antenna sub-system 22 configured as shown. Both the first antenna sub-system 21 and second antenna sub-system 22 are configured as active multi-mode antennas (modal antennas). A controller 23d, for example a network controller with access to an algorithm, is coupled to each of the first antenna sub-system, receiver (RX), frequency translator (FT), transceiver (TX), and second antenna sub-system. The components are shown coupled via transmission lines 23e. The algorithm in the network controller provides adaptive antenna system mode selection for both the first and second adaptive antenna sub-systems. Channel state information is received from first frequency band receiver and used for first adaptive antenna system mode selection. Channel state information from the second frequency band transceiver is used for second adaptive antenna system mode selection.

The controller can reside in the frequency translation module, or can be disposed outside the frequency translator module, for example, it may be coupled wirelessly from a connected WiFi enabled device.

Figure 6:
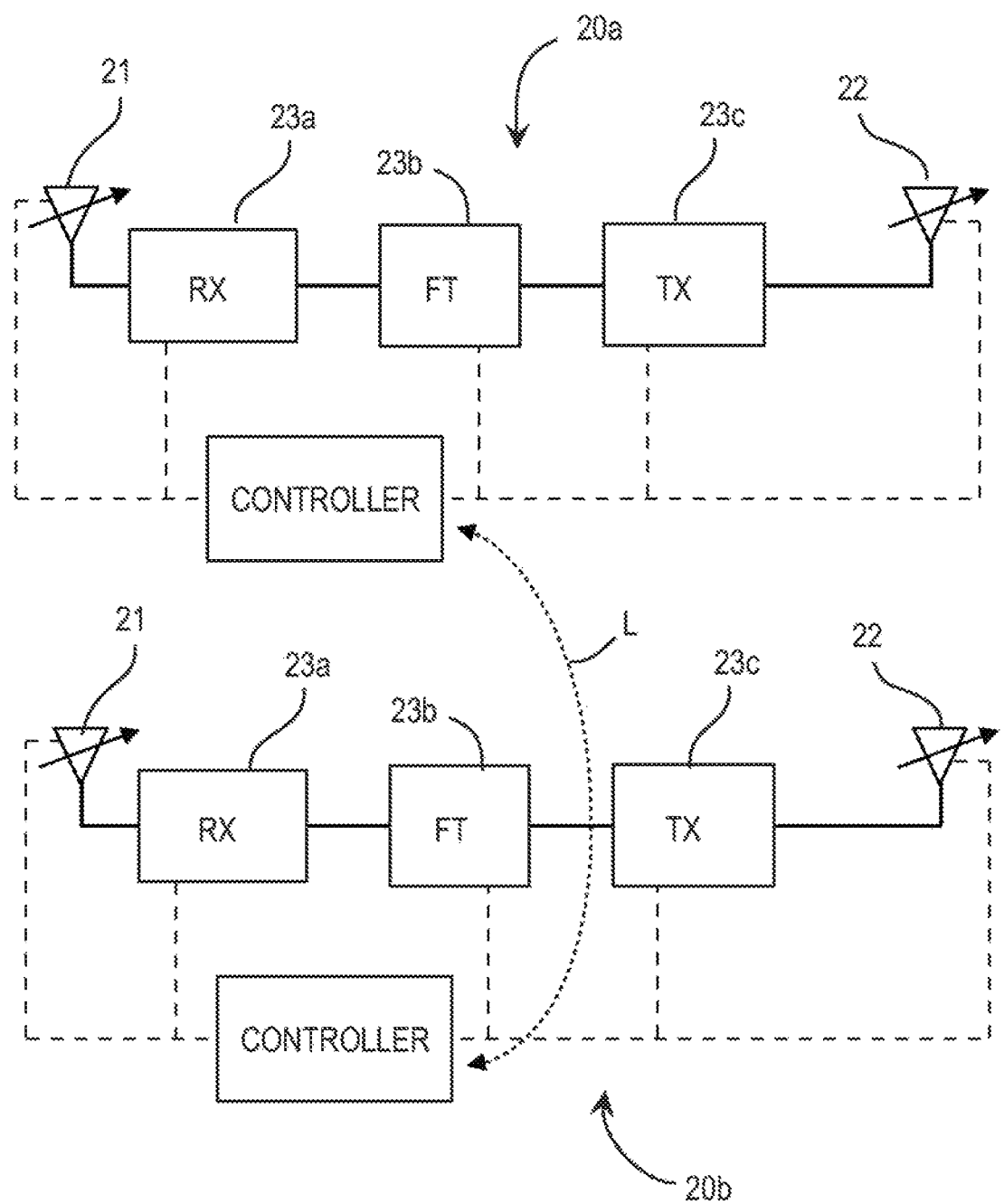
FIG. 6 shows an OTA distribution system in accordance with another embodiment. Here, two systems are provided, each configured as shown in FIG. 5.

FIG. 6 shows an OTA distribution system in accordance with another embodiment. Here, two systems are provided, each configured as shown in FIG. 5. A wireless communication link ("L") between the two systems 20a; 20b is used to configure each in a "Master" and "Slave" configuration. In this network of multiple systems, one or both systems may be implemented to achieve optimized signal between the transmission tower and WiFi devices.

FIG. 7 shows an example of a modular unit configured to receive OTA signals (UHF; VHF) from base tower 11, translate the signals into WiFi and transmit/rebroadcast through WiFi signals in a building (for example, with an access point 101 or WiFi enabled device).

The unit comprises a first active multi-mode antenna sub-system 21 including an antenna radiating element 71 positioned adjacent to a circuit board and forming an antenna volume therebetween, a first parasitic element 72 positioned within the antenna volume and coupled to a first active tuning component 72, a second parasitic element 73 is positioned outside of the antenna volume and adjacent to the antenna radiating element, the second parasitic element is further coupled to a second active tuning component 75. Each of the active tuning components 74; 75 are voltage controlled, and coupled to a controller 23d for receiving voltage signals used to adjust a current mode on each respective active tuning component. As the respective voltages are modulated at the components, a current mode on each of the parasitic elements 72; 73 is adjusted, thereby causing one or more of: steering antenna radiation pattern (induced by second parasitic located outside the antenna volume), or tuning a frequency response of the antenna radiating element (induced by first parasitic within the antenna volume).

The unit further comprises a second active multi-mode antenna sub-system 22 configured substantially similar to the first active multi-mode antenna sub-system 21 except tuned for WiFi communication. Second active multi-mode antenna sub-system 22 comprises an antenna radiating element 81 positioned adjacent to a circuit board and forming an antenna volume therebetween, a first parasitic element 82 is positioned within the antenna volume and coupled to a first active tuning component 84, a second parasitic element 83 is positioned outside of the antenna volume and adjacent to the antenna radiating element, the second parasitic element is further coupled to a second active tuning component 85. Each of the active tuning components 84; 85 are voltage controlled, and coupled to a controller for receiving voltage signals used to adjust a current mode on each respective active tuning component. As the respective voltages are modulated at the components, a current mode on each of the parasitic elements 82; 83 is adjusted, thereby causing one or more of: steering antenna radiation pattern (induced by second parasitic located outside the antenna volume), or tuning a frequency response of the antenna radiating element (induced by first parasitic within the antenna volume).

Finally, the unit comprises a translation circuit 23 shown bound in broken lines, the translation circuit comprises at least a first frequency band receiver 23a, a second frequency band transmitter 23c, and frequency translation circuit 23b therebetween.

First antenna system 21 receives OTA signals, the translation circuit 23 translates the OTA signals to form WiFi signals, and the second antenna system 22 rebroadcasts the signal via WiFi to any compatible device, preferably a television.

Figure 8:
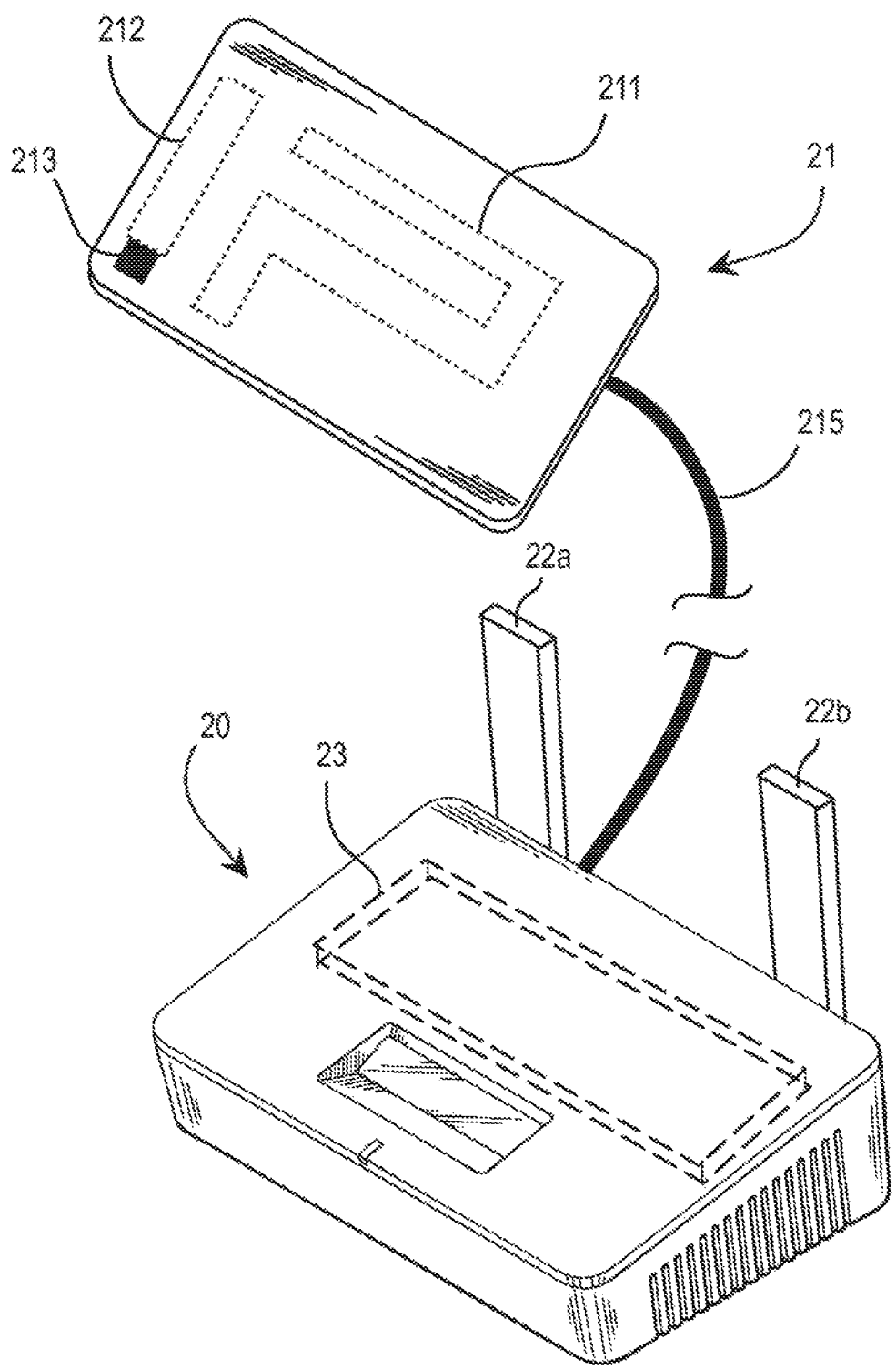
FIG. 8 shows a WiFi router configured to a system as described herein; the router is plug and play compatible with an OTA antenna.

In an exemplary commercial embodiment, as illustrated in FIG. 8, a WiFi router is configured to house the system 20 therein, and WiFi antennas 22a, 22b (passive or active multi-mode antennas) are used to communicate second signals to a television or other WiFi enabled device. Moreover, a first antenna sub-system 21 is configured to plug and play (via cable 215) with the WiFi Router-integrated system 20. The system may comprise optional display 23 for communicating and administrating settings. In addition, the first antenna sub-system 21 may include a radiating element 211, parasitic element 212, and active tuning component 213 as shown. Other implementations of the first antenna sub-system will be recognized by one having skill in the art. In this regard, first antenna sub-system 21 is configured to receive first signals from a broadcast tower (typically VHF and UHF bands), the signals are communicated via cable 215 to the router-integrated system 20, wherein the signals are translated from OTA bands to WiFi and retransmitted from antennas 22a; 22b to a WiFi enabled device, such as a television set. Thus, OTA bands are distributed in building via WiFi communication.

Note the length of cable 215 can span any distance, and may further couple with a tuner circuit or device for enhancing the signals received.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be exercised from the combination, and the claimed combination may be directed to a sub-combination or a variation of a sub-combination.

What is claimed is:

1. A system for distribution of over the air (OTA) content, the system comprising:
   a first antenna system comprising a first active multi-mode antenna configured to receive a first signal, the first signal including VHF frequencies in the range of 30 MHz to 300 MHz, UHF frequencies in the range of 300 MHz to 3 GHz, or a combination thereof;
   a translation circuit configured to translate the first signal into a second signal, wherein the second signal is distinct from the first signal, and wherein the second signal comprises a WiFi signal; and
   a second antenna system comprising a second active multi-mode antenna configured to wirelessly transmit the second signal.

2. The system of claim 1, the first antenna system comprising a receiver circuit.

3. The system of claim 2, wherein the receiver circuit comprises a television tuner circuit.

4. The system of claim 2, wherein the receiver circuit is housed in a circuit module.

5. The system of claim 4, wherein the translation circuit is further housed in the circuit module.

6. The system of claim 5, wherein the translation circuit comprises a demodulation circuit, a transcoding circuit, and a WiFi radio circuit.

7. The system of claim 6, the circuit module further comprising a processor, wherein the processor is configured to provide control signals for communicating with the first antenna system, the second antenna system, or the first and second antenna systems.

8. The system of claim 7, wherein the first active multi-mode antenna comprises:
   a radiating element positioned adjacent to a circuit board forming an area between the radiating element and the circuit board,
   a first parasitic element positioned adjacent to the radiating element and at least partially disposed within the area, and
   a second parasitic element positioned adjacent to the radiating element and disposed outside of the area formed between the radiating element and the circuit board.

9. The system of claim 8, wherein the first active multi-mode antenna further comprises a first active tuning component coupled to the first parasitic element, the first active tuning element further coupled to the processor, wherein the processor is configured to communicate first control signals to the first active tuning component for varying a tuning state thereof, and wherein the tuning state of the first active tuning component is adapted to vary a reactance associated with the first parasitic element for changing a current mode associated with the radiating element.

10. The system of claim 8, wherein the first active multi-mode antenna further comprises a second active tuning component coupled to the second parasitic element, the second active tuning element further coupled to the processor, wherein the processor is configured to communicate second control signals to the second active tuning component for varying a tuning state thereof, and wherein the tuning state of the second active tuning component is adapted to vary a reactance associated with the second parasitic element for steering a radiation pattern associated with the radiating element.

11. The antenna system of claim 6, wherein:
   the receiver circuit is configured to receive the first signal and communicate the first signal to the demodulation circuit coupled therewith,
   the demodulation circuit is configured to demodulate the first signal and communicate the demodulated first signal to the transcoding circuit coupled therewith,
   the transcoding circuit is configured to convert the demodulated first signal into the second signal, and
   the WiFi radio circuit is configured to communicate the second signal to the second antenna system for transmitting the second signal to a television unit or access point.

12. The system of claim 1, wherein the second antenna system and the translation circuit are housed in a device, and wherein the first antenna system is coupled to the device via a coaxial cable extending therebetween.

13. A method for distributing over the air content in a building, the method comprising:
   receiving a first signal from a broadcast tower using a first multi-mode active antenna of a first antenna system, the first signal including VHF frequencies in the range of 30 MHz to 300 MHz, UHF frequencies in the range of 300 MHz to 3 GHz, or a combination thereof;

converting the first signal to a second signal, wherein the second signal comprises a WiFi signal; and wirelessly transmitting the second signal to a media device using a second multi-mode active antenna of a second antenna system.

14. The method of claim 13, wherein the second signal comprises a WiFi signal selected from the group consisting of: 2.4 GHz, which is 802.11 b/g/n, 3.65 GHz which is 802.11 y, 4.9 GHz which is 802.11 j, 5 GHz which is 802.11 a/h/j/n/ac, 5.9 GHz, which is 802.11 p, 60 GHz which is 802.11 ad, and 900 MHz which is 802.11 ah.

15. The method of claim 13, wherein the media device comprises a television unit.

16. The method of claim 13, wherein the media device comprises an access point.

17. The system of claim 1, wherein the second signal comprises a WiFi signal selected from the group consisting of: 2.4 GHz, which is 802.11 b/g/n, 3.65 GHz which is 802.11 y, 4.9 GHz which is 802.11 j, 5 GHz which is 802.11 a/h/j/n/ac, 5.9 GHz, which is 802.11 p, 60 GHz which is 802.11 ad, and 900 MHz which is 802.11 ah.

* * * * *